Figure 1:
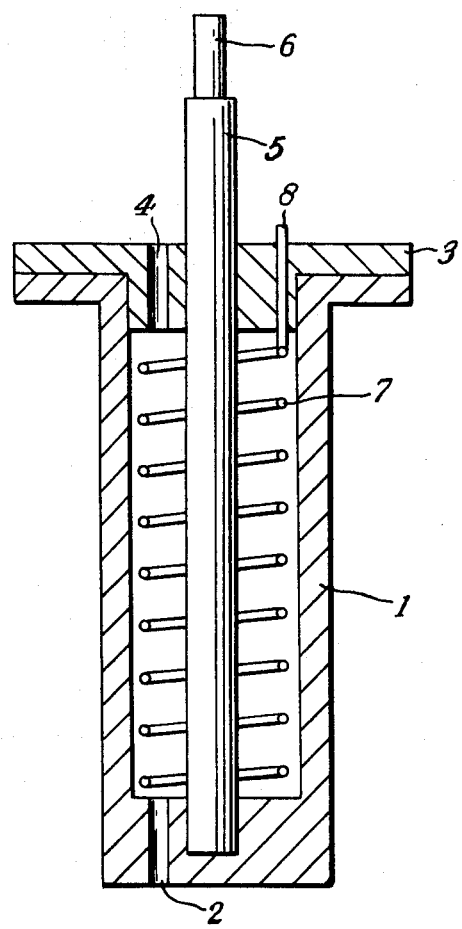

United States Patent

[11] 3,567,880

[72] Inventors: Malcolm George Palmer, Blakedown, near Kidderminster; Frederick Arthur Ridgway, Stourbridge; Edwin Leslie Minshull Roberts, Harborne, Birmingham, England
[21] Appl. No.: 824,058
[22] Filed: May 13, 1969
[45] Patented: Mar. 2, 1971
[73] Assignee: Albright & Wilson Limited, Oldbury, near Birmingham, Warwickshire, England
[32] Priority: May 24, 1968
[33] Great Britain
[31] 24991/68

[54] SUBMARINE SIGNALLING DEVICE AND FAIL-SAFE SWITCH
10 Claims, 2 Drawing Figs.

[52] U.S. Cl. .................................................. 200/61.08, 335/205
[51] Int. Cl. .................................................. H01h 35/00
[50] Field of Search .................................................. 200/61.08; 200/152.4; 102/19.2, 114; 335/205

[56] References Cited
UNITED STATES PATENTS

| | | | |
|---|---|---|---|
| 2,351,036 | 6/1944 | Grant | 200/152.4 |
| 2,792,566 | 5/1957 | Shanhouse et al. | 200/152.4X |
| 3,122,001 | 2/1964 | Pritchett et al. | 200/61.08X |
| 3,421,124 | 1/1969 | Kidd | 335/205 |

OTHER REFERENCES

German Application, Auslegeschrift 1057501, Jose Mena, et al., (3pg. spec., 1 sheet dr.) May 14, 1959— 102— 14 (copy in Scientific Library).

IBM Technical Disclosure Bulletin, " Multiconfiguration Pressure Switch" Bolan et al., Vol. 8 No. 7 December 1965 335— 205 (copy in Scientific Library)

Primary Examiner—Robert K. Schaefer
Assistant Examiner—M. Ginsburg
Attorney—Herbert H. Goodman ABSTRACT: A submarine detonation device comprises a sea water switch and/or a fail-safe switch. The sea water switch comprises an anode, a cathode and a floodable interelectrode interspace. The fail-safe switch comprises two terminals held in nonoperative position by the field of a magnet, which magnet is retained in position by a water-soluble retaining plug. On submersion the retaining plug disintegrates so allowing displacement of the magnet by a displacing means and consequent transposition of the terminals into an operative position under the influence of a spring means.

SUBMARINE SIGNALLING DEVICE AND FAIL-SAFE SWITCH

This invention relates to submarine signalling devices designed to detonate at a predetermined depth.

Submarine signalling devices usually function by causing a small explosion at an appropriate depth of water. A conventional signalling device comprises an electric detonator and an electric cell connected thereto via a pressure switch which is designed to close when the external pressure on the device reaches a certain value.

However, such systems have hitherto had a number of disadvantages. For instance, it is a requirement of a signalling device that even if a fault develops, for instance in the pressure switch, it be not liable to explode when out of contact with water. It is therefore desirable to include in the device a second means of ensuring that detonation cannot occur before submergence. One method which has been proposed of accomplishing this is to use as the electric power source a sea cell, that is an electrolytic cell which emits an electric current only when immersed in water. However, sea cells would generally require silver or a silver compound as an electrode, thus adding to the cost of the apparatus. They may also have undesirable electrical characteristics in that they provide an initially small but increasing current whereas a high initial current is preferable for firing a detonator which may otherwise become conditioned and not fire at all.

A further unsatisfactory feature of previously known submarine signalling devices is that if for any reason a device does not reach its predetermined detonation depth, for instance by becoming lodged on top of a submarine, or by falling onto a shelf on the sea bottom, or if the pressure switch fails to become activated at the desired depth, then the device will not explode immediately but will remain active and will possibly detonate later with unfortunate consequences.

The present invention provides a submarine signalling device which comprises a detonator connected in electrical series with a battery; a pressure switch; a sea water switch which comprises an anode and a cathode, the space between which becomes filled with sea water on immersion of the device in the sea and/or a fail safe switch which may be connected in series or in parallel with the battery and comprises two electrically conducting terminals which, in operative position, may disconnect or short circuit the battery, as the case may be, the terminals being held in nonoperative position against the action of a spring loading by a magnetic field produced by an electrically isolated permanent magnet maintained in position by a retaining plug of a partially or wholly water soluble material in such a way that, on immersion of the device in water, the retaining plug is wetted and its physical structure disintegrated so that the magnet is displaced by gravity or by a spring mechanism so as no longer to influence the conducting terminals.

Sea water switches and fail-safe switches as hereinbefore defined, and submarine signalling devices comprising either of such switches are also novel and are included within the scope of the invention.

Thus the sea water switch of the invention may render a submarine signalling device inactive when out of water by virtue of the nonconducting air-filled interspace between the anode and the cathode. On immersion of the device in the sea the interspace becomes flooded and permits conduction by virtue of the electrolyte nature of sea water.

The fail-safe device of the invention ensures that after immersion of a submarine signalling device in water the detonation circuit is only operative for a given length of time, i.e. whilst the physical structure of the retaining plug is intact. The nature of the retaining plug may be varied according to the desired active lifetime of the device.

A number of metals such as aluminum or lead may be used for the anode of the sea water switch but the preferred metals are magnesium alloys, e.g. magnesium sodium, magnesium-lead or magnesium-aluminum alloys; most preferably magnesium itself is employed. This use of magnesium has two particularly advantageous features which stem from the highly electropositive character of the metal. Thus firstly, because of the high electrode potential of magnesium the voltage drop across the anode-electrolyte interface during transmission of current is small so that the resistance of the cell is minimized. The second advantageous feature is that after flooding of the switch and before the passage of current magnesium atoms from the anode have a strong tendency to go into solution as ions so causing an electrical double layer to be formed about the anode. This double layer functions in the same way as an electrical capacitor which is discharged through the external circuit when the pressure switch closes. In this way a short duration, high current pulse of energy is initially passed through the detonator. This is the most suitable type of discharge for firing.

The passage of current through the switch occurs by electrolysis of the sea water between the electrodes. Since hydrogen is discharged at the cathode it is desirable that the cathode should have a surface of a metal with a low hydrogen overvoltage so as to further maximize conductivity. Cathodes made of, or plated with, nickel or silver are particularly useful in this respect and are used in the preferred construction of the cell.

The shape, construction and clearance of the electrodes are not critical but to maximize the conductivity of the cell it will generally be desired to use electrodes of as large a functional area as possible and placed as close together as possible. It is desirable to construct the casing of the switch in such a way as to facilitate rapid flooding on submergence.

Figure 2:
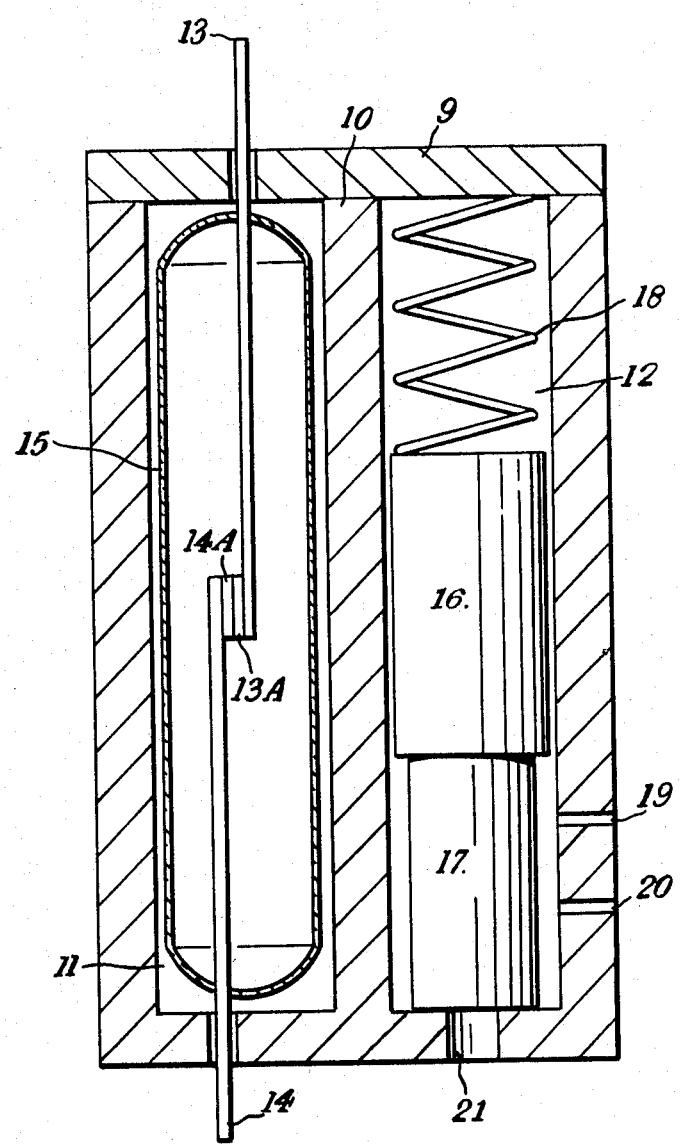

In the drawings, FIG. 1 is a diagrammatic cross-sectional elevation of the sea water switch; and FIG. 2 is a diagrammatic sectional elevation of the fail-safe switch.

A preferred form of sea water switch is illustrated by means of FIG. 1 of the accompanying drawings, which is a diagrammatic cross-sectional elevation of the switch. The apparatus depicted comprises a plastic container 1 of cylindrical cavity with an aperture 2 at its base and closed by a plastic top 3, containing an aperture 4. Protruding through the top 3 into the inside of the container is a rod 5 of an electrically conducting material plated with silver. The rod is coaxial with the container and is sunk into the base thereof.

The rod 5 is connected to a lead 6 which, in use of the device, is connected to a pressure switch (not shown) and thence via a detonator to the negative terminal of a battery. A helical magnesium coil 7 is also contained coaxially inside the container 1 being at a distance of about 2 mms. from rod 5 and disposed around the interior walls of the container. The coil 7 is connected by a lead 8 passing through the top 3 to the positive terminal of a battery (not shown).

When the apparatus is used the rod 5 serves as a cathode, and the magnesium coil 7 serves as an anode. On immersion in sea water the presence of the apertures 2 and 4 allows sea water to displace the air within the container and closure of the pressure switch then completes the electric circuit through the sea water switch.

The sea water switch thus provides a safeguard against the unwanted activation of the detonator due to the pressure switch closing accidentally, for example because of a fault or because of the device being dropped. In all such cases the detonator will be prevented from firing since the sea water switch is on open circuit until filled with sea water.

The use of a magnetic field to maintain contact between the terminals in the fail-safe device of the invention is particularly advantageous in that it permits the terminals to be sealed off in an airtight and watertight enclosure, for instance in a sealed glass container. The risk of deterioration of the device by corrosion or accidental mechanical displacement of the system may thus be substantially eliminated. Any method of spring loading sufficient to hold the terminals in their operative position on the removal of the magnetic field may be used. For this purpose we have found it convenient to employ as terminals the ends of metal strips, the strips being sealed into the container in such a way that one or both of them is in a state of tension when in nonoperative position under the influence of the magnetic field. Such a system is similar to the "Reed Switch" used in telephony. On removal of the field the restoring force of the tension is sufficient to operate the terminals.

The magnet providing the said magnetic field is retained in position by a plug of a partially or wholly water soluble material. The nature and dimensions of this retaining plug should be chosen so as to permit the physical structure of the plug to disintegrate under the action of the sea water within the desired period. We prefer to use alkali-metal halides, for instance potassium bromide, for this purpose.

The displacement of the magnetic may be brought about by the action of gravity, in which case the buoyancy characteristics of the signalling device should be such as to ensure that on submergence, the retaining plug is substantially vertically below the magnet. Preferably, however, the magnet is displaced by the expansion of a spring.

A preferred embodiment of "fail-safe" switch for use in the present invention is illustrated by FIG. 2 of the accompanying drawings, which is a diagrammatic sectional elevation. The apparatus represented comprises a plastic case 9 divided by a central member 10 into two isolated compartments 11 and 12.

Compartment 11 contains two resilient electrically conducting strips, 13 and 14 sealed into a glass sheath 15. The conductors 13 and 14 touch at terminals 13A and 14A and protrude through the sheath 15 and the plastic case 9 to the outside, where connection may be made to an electrical circuit. The conductors 13 and 14 are set into the plastic case 9 in such a way as to be under a mechanical stress when they are touching.

The compartment 12 contains a magnet 16 placed so that its field pulls together the terminals 13A and 14A in the adjoining compartment 11. The magnet 16 is sandwiched between a block of potassium bromide 17 resting on one end of the compartment 12 and a compressed spring 18 resting against the other end of the compartment. Bored through the external wall of the case 9 next to the potassium bromide block 17 are holes 19 and 20. A larger hole 21 is bored through the bottom of the plastic case 9 below the potassium bromide block.

When the mechanism is submerged, water enters through the holes 19,20 and partially dissolves the potassium bromide block 17. The spring 18 then tends to expand, so pushing the magnet 16 along the compartment and forcing the partially dissolved block 17 through the hole 21. The influence of the magnetic field on the terminals 13A and 14A is thus removed and the terminals spring apart as the mechanical stress in the conductors 13 and 14 resolves itself.

In operation the conductors 13 and 14 may be connected externally and in series to a series circuit comprising a battery, detonator, pressure switch and sea water switch as herein described.

We claim:

1. For use in a submarine signalling device having a battery, a detonator, a pressure switch means operatively connected in a series electrical circuit, and a sea water switch comprising a housing means and an anode and a cathode in said housing means electrically connected to said electrical circuit and electrically interconnectable through an interspace floodable via orifices in said housing means: the improvement comprising a fail-safe switch comprising a container means having orifices, two electric terminals in said container means for electrical connection to said battery, a permanent magnet magnetically influencing said electric terminals to maintain them in nonoperative position, a spring-loading means urging said electrical terminals to an operative position, a plug means maintaining said magnet in said position, said plug means being constructed of a material which disintegrates upon contact with sea water over a specified time period, and a displacing means urging said magnet in the direction of said plug means whereby on immersion of the fail-safe switch water enters through said orifices in said container means and disintegrates said plug means over said specified time period thereby allowing displacement of said magnet by action of said displacing means and consequent translation of said electric terminals to an operative position under the action of said spring loading means.

2. For use in a submarine signalling device having a battery, a detonator, and a pressure switch means operatively connected in a series electrical circuit: the improvement which comprises a fail-safe switch for connection to said battery so as to render said circuit inoperative when said fail-safe switch is operative, said fail-safe switch comprising a container means, two electric terminals in said container means for electrical connection to said battery, a permanent magnet magnetically influencing said electric terminals to maintain them in nonoperative position, a spring-loading means urging said electrical terminals to an operative position, a plug means maintaining said magnet in said position, said plug means being constructed of a material which disintegrates upon contact with sea water over a specified time period, and a displacing means urging said magnet in the direction of said plug, whereby on immersion of the device water enters through orifices in said container means and disintegrates said plug means over said specified time period thereby allowing displacement of said magnet by action of said displacing means and consequent translation of said electric terminals to an operative position under the action of said spring loading means.

3. The device of claim 2 wherein said fail-safe switch is adapted for series connection and wherein said electric terminals are out of contact when in operative position.

4. A fail-safe switch comprising a container means, two electric terminals in said container means for electrical connection to a battery, a permanent magnet magnetically influencing said electric terminals to maintain them in nonoperative position, a spring-loading means urging said electrical terminals to an operative position, a plug means maintaining said magnet in said position, said plug means being constructed of a material which disintegrates upon contact with sea water over a specified time period, and a displacing means urging said magnet in the direction of said plug means whereby on immersion of the device water enters through orifices in said container means and disintegrates said plug means over said specified time period thereby allowing displacement of said magnet by action of said displacing means and consequent translation of said electric terminals to an operative position under the action of said spring loading means.

5. A fail-safe switch as claimed in claim 4 wherein said container means is sealed.

6. A fail-safe switch as claimed in claim 5 wherein the electric terminals are metal strip members and said spring-loading means is provided by a tension existing in at least one of said strip members when said terminals are in nonoperative position.

7. The device of claim 6 wherein said fail-safe switch is adapted for series connection and wherein said electric terminals are out of contact when in operative position.

8. The device of claim 7 wherein said plug means of said fail-safe switch comprises potassium bromide.

9. A fail-safe switch as claimed in claim 4 wherein said displacing means is a spring.

10. A fail-safe switch as claimed in claim 4 wherein said plug means comprises potassium bromide.